Patented Mar. 26, 1929.

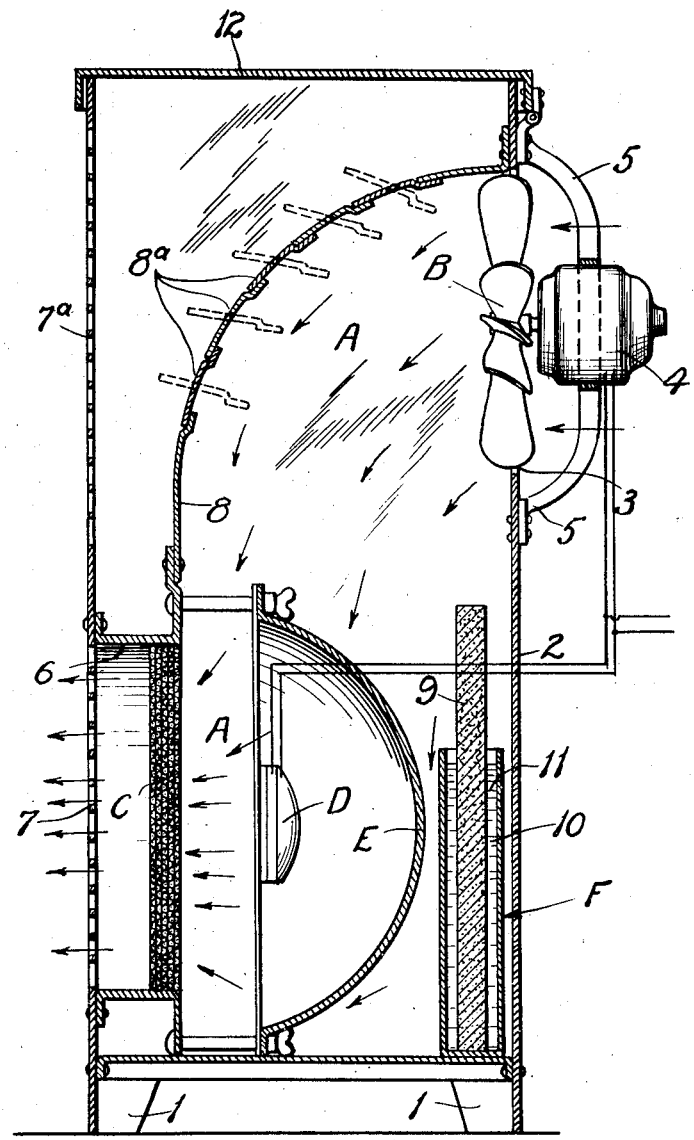

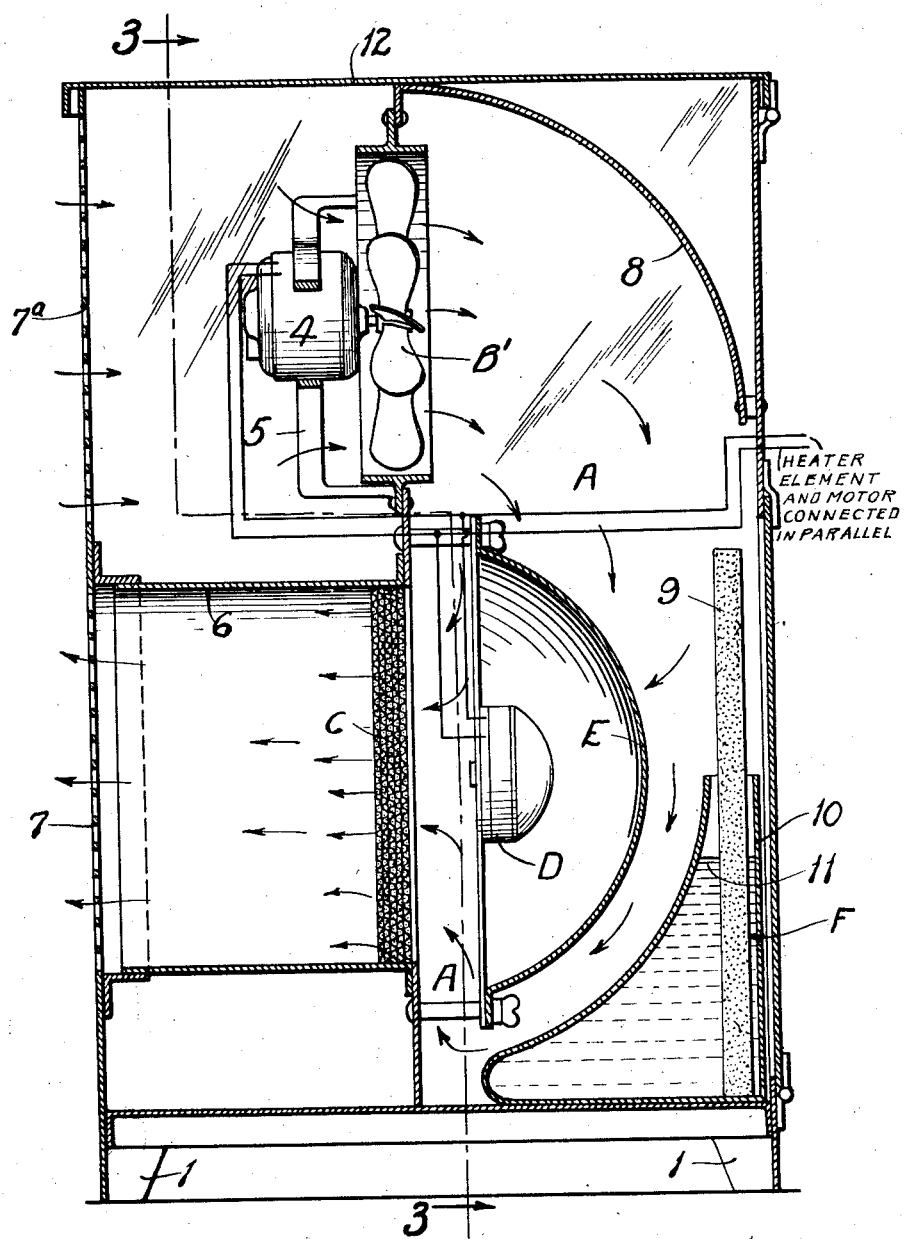

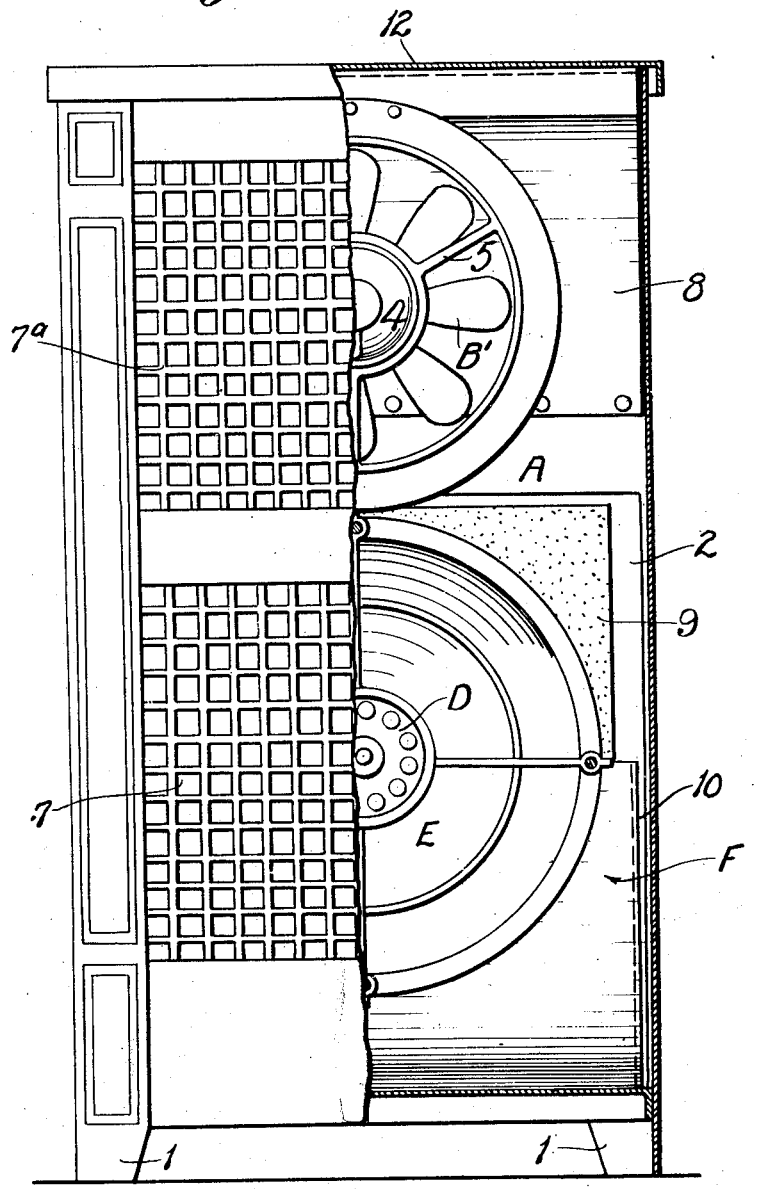

1,706,846

UNITED STATES PATENT OFFICE.

ERNEST F. FISHER, OF ST. LOUIS, MISSOURI, ASSIGNOR TO FANAIRE HEATER COMPANY, OF ST. LOUIS, MISSOURI, A CORPORATION OF MISSOURI.

HEATING APPARATUS.

Application filed August 15, 1927. Serial No. 213,077.

This invention relates to a heating apparatus of the type described in my pending application for patent Serial No. 164,089, filed January 27, 1927, which comprises a heating device, a heat absorber, a reflector or other suitable means combined with said heating device and absorber in such a way that heat waves emanating from said heating device will strike against said reflector and be projected by same against said heat absorber, and means for causing air to circulate over or through said heat absorber, whereby said air will be heated by conduction.

In an apparatus of the kind mentioned there is no physical contact between the heating device or heating means and the heat absorber, but, nevertheless, the apparatus has an exceptionally high degree of efficiency, due to the fact that the luminous and non-luminous heat waves emitted by the heating device are collected in a medium, to wit, the heat absorber, which gives up its heat readily to air that comes in contact with the same, which air is subsequently used to heat a compartment or space.

One object of my present invention is to provide a heating apparatus of the general type referred to, which is of such construction that the heat waves projected from the reflector onto the heat absorber will pass through atmosphere containing water vapor, thereby insuring the heat waves emanating from the heating device being effectively absorbed and transmitted to the heat absorber.

Another object is to provide a heating apparatus of the general type mentioned, which is of such design that the heated air discharged from the apparatus will have a natural tendency to travel a considerable distance in a substantially horizontal path, before rising, thereby producing a more uniform temperature in the room or compartment into which the heated air is discharged, due to the distribution of the heated air through a zone of relatively great area.

Another object is to provide a heating apparatus, which, in addition to having the desirable features and characteristics of the apparatus described in my said pending application for patent, is of attractive appearance, inexpensive to manufacture and of such construction that the various units of same are easily accessible for inspection, repair or cleaning.

And still another object of my invention is to provide an electrically-operated heating apparatus that is adapted to be used in cold weather for supplying heated air to a room or compartment and used in warm weather to perform the same function as the conventional electric fan. Other objects and desirable features of my invention will be hereinafter pointed out.

Figure 1 of the drawings is a vertical longitudinal sectional view of an apparatus embodying my present invention.

Figure 2 is a similar view, illustrating an apparatus of slightly different form embodying my present invention; and Figure 3 is a front elevational view, partly in vertical transverse section on the line 3—3 of Figure 2.

The apparatus illustrated in Figure 1, which represents the preferred form of my invention, comprises a casing of any preferred shape and dimensions, constructed so as to form an air circulating passageway A through which air can be forced or drawn by a fan B, a heat absorber C arranged in said air passageway, a heating device D arranged in said air passageway, a reflector or other suitable means E arranged in such relationship with said heating device and heat absorber that some of the heat waves emanating from the heating device D will strike against the reflector E and be projected by same onto the heat absorber C, and a means designated as an entirety by the reference character F for causing the heat waves projected from the reflector onto the heat absorber C to travel through atmosphere containing water vapor, thereby insuring more thorough absorption of the heat waves emanating from the heating device D and transmission of said heat waves to the heat absorber C.

In the form of my invention illustrated in Figure 1 the casing of the apparatus is constructed principally from sheet metal and said casing is of substantially oblong form in general outline and is arranged in an upright position on supporting legs 1. In the rear wall 2 of said casing adjacent the upper end of same is an inlet 3 for the air which is to be heated, and the fan B is arranged in said air inlet and combined with an electric motor 4 that is sustained by a supporting frame 5 secured to the rear wall 2 of the casing. The outlet of the air passageway of the casing through which the heated air is discharged into the room or compartment in which the apparatus is located is formed by a tubular member 6 arranged inside of the casing adjacent a grille 7 located in the front wall of the casing adjacent the lower end of same the walls of said air passageway being formed by the rear wall, side walls and bottom of the casing, and a transversely-disposed, curved partition 8 inside of the casing whose lower end is attached to the top edge of the tubular member 6 previously referred to and whose upper end is attached to the rear wall 2 of the casing at a point above the air inlet 3. The heat absorber C is arranged inside of the tubular member 6, and the reflector E, which preferably consists of a substantially concavo-convex-shaped shell, is arranged at the rear of the heat absorber C in concentric relation with same and in spaced relation with the tubular member 6 so that some of the air circulating through the air passageway A will come in contact with the heating device D, and thus be preheated by conduction from contact with said heating device. The apparatus can be provided with any suitable type or kind of heating device D, but I prefer to use an electrically-operated device, which is arranged in the focal point of the reflector E. The heat absorber C can be constructed in various ways, but it is herein illustrated as being composed of numerous layers of screen cloth or pieces of screening clamped together and arranged transversely across a circular opening formed at the rear end or inlet end of the tubular member 6 or in a vertically-disposed partition plate inside of the housing which carries said tubular member. The heat absorber C effectively blocks off the passage of the heat waves, but permits air to flow through the same, and the surfaces of said heat absorber are preferably coated with a dead black paint to better absorb the thermal radiations.

The means F, previously referred to, that is used to supply moisture to the atmosphere through which the reflected heat waves from the reflector E travel, is herein illustrated as being formed by a vaporizer or member 9, constructed of some suitable porous material, that projects into a tank 10 in the air passageway A that contains water 11, said vaporizer 9 being arranged in the water tank in such a way that a portion of said member will be acted upon by some of the air circulating through the air passageway of the apparatus. The air that contacts with or circulates over the exposed portion of the vaporizer 9 evaporates the water on or in said exposed portion, and thus produces water vapor which is carried into the space between the reflector E and the heat absorber C by the air that circulates through said space when the fan B is in operation. Due to the fact that the heat waves reflected by the reflector onto the heat absorber C pass through atmosphere charged with water vapor the heat waves thrown off the reflector will be effectively absorbed. As shown in Figure 1, the water tank 10 is arranged on the bottom of the casing between the rear side of the reflector E and the rear wall 2 of the casing.

When the fan B is in operation air will be drawn into the casing of the apparatus and then forced through the heat absorber C some of the air circulating over the vaporizer 9 and some of the air also coming in contact with the heating device D and becoming preheated by conduction before passing through the heat absorber C which gives up its heat to the air that is forced through the same. Notwithstanding the fact that the heating device D of the apparatus is not in physical contact with the heat absorber C, the apparatus above described is exceptionally efficient, for it makes use to the fullest extent of the luminous and non-luminous heat waves emitted from the the heating device D, to heat air which is positively expelled into the room or compartment in which the apparatus is located or which is conveyed through a conduit to a distant part of the building in which the apparatus is used.

Another very desirable characteristic of the apparatus above described is that it is of such design that the heated air discharged from same will have a natural tendency to travel a considerable distance in a substantially horizontal path before rising, thereby producing a more uniform temperature in the room into which the heat is discharged. This is due to the fact that the air which flows through the central portion of the heat absorber C is heated to a higher temperature and remains at a higher temperature than the air which flows through the peripheral portion of said heat absorber, on account of the fact that the air which flows through the central portion of said absorber has become preheated by contact with a heating device D, arranged at the focal point of the reflector. The result is, the column of air which is projected forwardly from the heat absorber C into the space or room in which the apparatus is located is made up of a center core composed of highly heated air that is surrounded by cooler air, the column of heated air being held to a certain level and caused to flow a considerable distance in a substantially horizontal path by the layer of cooler air which surrounds the same. In other words, the core of highly heated air will be projected forwardly a considerable distance from the apparatus, before it tends to rise, and as it rises, it slowly filters through the cooler air that surrounds the same, thereby tending to equalize the temperature of the room, and moreover, cause the apparatus to distribute heated air through a zone of relatively great area.

The particular cross-sectional shape of the discharge portion of the passageway of the apparatus through which the air circulates, is, of course, immaterial, and the relationship between the heat absorber, the heating device and the reflector can be varied without departing from the spirit of my invention. I prefer, however, to combine said units so that some of the air, in passing through the apparatus, will become preheated before coming in contact with the heat absorber and will be caused to flow in a path or zone located inside of a zone of relatively cooler air.

The partition member 8, previously referred to, is preferably provided with a number of hinged or pivotally mounted valves or sections 8$^a$ that can be arranged in the position shown in broken lines in Figure 1, and the portion of the front wall of the casing that is located in front of the partition member 8 is provided with an ornamental grille or grating 7$^a$. By constructing the apparatus in this way it can be used in the summer time to perform the same function as a conventional electric fan, simply by opening the movable sections 8$^a$ of the partition member 8, thus causing the fan B to create a current of air which is forced forwardly through the grille 7$^a$ in the front wall of the casing. The top wall 12 of the casing is preferably hinged or constructed in such a way that it can be opened easily, and the partition member 8 is also preferably constructed in such a way that it can be removed easily to provide access to the various units arranged at the lower end of the casing, i. e., the heat absorber, heating device, reflector and the means F that is used to supply moisture to the air which is heated by the apparatus.

The apparatus illustrated in Figures 2 and 3 embodies all of the desirable features and characteristics previously explained of the apparatus shown in Figure 1, but the inlet of the air passageway is formed in the front wall of the casing and the fan B' is so arranged that it will draw air inwardly through a grille 7$^a$ in the upper portion of the front wall of the casing and cause said air to circulate through the heat absorber C and be discharged forwardly through the grille 7 in the lower portion of the front wall of the casing, as indicated by the arrows in Figure 2.

Having thus described my invention, what I claim as new and desire to secure by Letters Patent is:

1. A heating apparatus, comprising a casing having upright walls, one of which is provided with an air outlet, a heat absorber in said casing arranged adjacent said outlet, a heating device at the rear of said heat absorber, a reflector for collecting or gathering together heat waves emanating from said heating device and projecting said heat waves onto said absorber, and means for causing air to circulate through said casing and be discharged through said outlet, said reflector being disposed so as to cause some of the air circulating through the casing to come in direct contact with the heating device, whereby a stream of highly heated air surrounded by a stream of cooler air will be discharged in a substantially horizontal direction through said outlet.

2. A heating apparatus, comprising a casing having upright walls, one of which is provided with an air outlet, a heat absorber in said casing arranged adjacent said outlet, a heating device at the rear of said heat absorber, a reflector for collecting or gathering together heat waves emanating from said heating device and projecting said heat waves onto said absorber, means for causing air to circulate through said casing and be discharged through said outlet, said reflector being disposed so as to cause some of the air circulating through the casing to come in direct contact with the heating device, whereby a stream of highly heated air surrounded by a stream of cooler air will be discharged in a substantially horizontal direction through said outlet, a water receptacle in said casing, and a vaporizer partially submerged in the water in said receptacle and arranged so that a portion of said vaporizer will be acted upon by some of the air circulating through the casing.

3. A heating apparatus, comprising a casing provided with a passageway through which air circulates, a heat absorber arranged in position to be acted upon by the air circulating through said pasageway and composed of numerous layers of screen cloth or pieces of screening clamped together, a heating device arranged in proximity to said heat absorber, and a reflector for collecting or gathering together heat waves emanating from said device and projecting said heat waves onto said heat absorber.

ERNEST F. FISHER.